June 22, 1971 — R. HABERT — 3,585,672
STIRRUP CONNECTION FOR WINDSHIELD WIPERS
Filed June 12, 1969

INVENTOR
ROGER HABERT
BY
Amirie & Smiley
ATTORNEYS

June 22, 1971  R. HABERT  3,585,672

STIRRUP CONNECTION FOR WINDSHIELD WIPERS

Filed June 12, 1969  2 Sheets-Sheet 2

INVENTOR
ROGER HABERT

BY
*Amiriet Smiley*
ATTORNEYS

United States Patent Office 3,585,672
Patented June 22, 1971

3,585,672
STIRRUP CONNECTION FOR WINDSHIELD
WIPERS
Roger Habert, Paris, France, assignor to
Ducellier & Cie, Paris, France
Filed June 12, 1969, Ser. No. 832,652
Claims priority, application France, June 18, 1968,
155,439
Int. Cl. B60s 1/04, 1/34; A47l 1/00
U.S. Cl. 15—250.32      6 Claims

ABSTRACT OF THE DISCLOSURE

The connections between the main and intermediate stirrups of a windshield wiper blade include a rubber bushing having side cheek pieces or flaps which fit between the legs of the main stirrup and the side walls of the intermediate stirrup while the usual pivot pin joins the stirrups. The main body of the bushing is frictionally held within an opening in the intermediate stirrup and forms an abutment or stop for the main stirrup. A tail piece of the bushing snaps into another opening in the intermediate stirrup and completes the frictional interlock of the bushing.

BACKGROUND OF THE INVENTION

The pivot pin connections between the ends of the main stirrup and the central portions of the intermediate stirrups of a windshield wiper blade assembly allow for a certain lost motion or play therebetween which increases as the parts become worn. This not only produces noise while the blade assembly is being operated, but also allows the blade to tilt from side to side as its direction is reversed and thereby allows the blade to deviate from its intended plane of perpendicularity with respect to the windshield, thus leading to less than optimum cleaning action.

The fitting of washers between the side pieces of the main and intermediate stirrups offers a partial solution to the problem but it is time consuming to fit these washers between the side pieces mentioned and to align them with the pivot pin which extends through the stirrups and pivotally joins them.

BRIEF SUMMARY OF THE INVENTION

Accordingly, it is an object of the present invention to provide an improved form of interconnection between the main and secondary or intermediate stirrups of a windshield wiper blade assembly which includes a resilient bushing or like member which is snap-fitted into the intermediate stirrup with its openings aligned with the openings in the intermediate stirrup so as to easily allow assembly of the main and intermediate stirrups.

It is further an object of this invention to provide an improved form of interconnection as aforesaid wherein the bushing includes side cheek pieces or flaps which extend between the side pieces of the main stirrup and the side walls of the intermediate stirrup and thus to take up lost motion between the two stirrups thereby to prevent noise when the wiper is operated and also to resist deflection of the wiper blade relative to the main stirrup.

The bushing further includes a tail portion which is snap-fitted into an opening in the intermediate stirrup and it also includes a nose portion provided with a slot which receives an edge of the web of the intermediate stirrup defining the main opening therein so that the pivot pin openings in the bushing are generally aligned with the openings in the intermediate stirrup so as to permit easy assembly of the main and intermediate stirrups.

Still further, the bushing is provided with a ridge engageable with the end edge of the top wall of the main stirrup better to control the action of the intermediate stirrups.

BRIEF DESCRIPTION OF THE DRAWING FIGURES

DETAILED DESCRIPTION OF THE INVENTION

Figure 1:
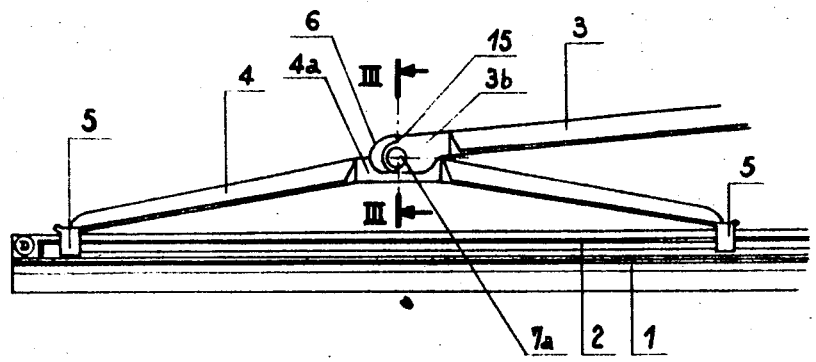
FIG. 1 is an elevational view showing an end portion of a wiper blade assembly constructed according to the present invention.

With reference to FIG. 1, the resilient wiper blade is indicated by the reference character 1 and, as is conventional, same is provided with an embedded flexible metal backing strip 2 which is slidably gripped by the bifurcated ends 5 of an intermediate stirrup 4 at each end of the wiper blade. The main stirrup 3 bridges at its opposite ends between a pair of the intermediate stirrups 4 and is pivotally connected thereto by the pivot pins 7 shown in FIGS. 2 and 3, such pivot pins conventionally being provided with headed portions 7a and the central portion of the main stirrup 3 is connected to the windshield wiper driving arm as is conventional.

Figure 2:
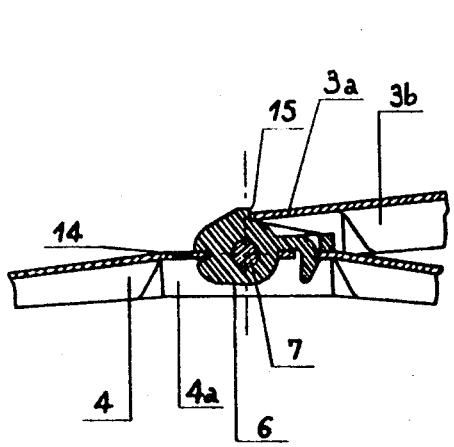
FIG. 2 is an enlarged longitudinal section of the interconnection between the main and intermediate stirrups.
Figure 3:
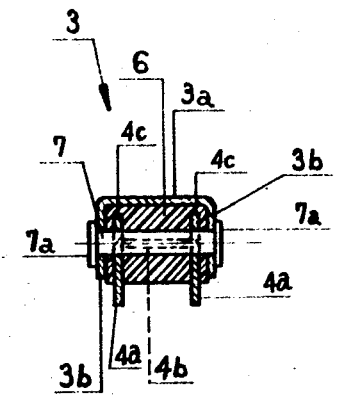
FIG. 3 is an enlarged transverse section taken substantially along the plane of section line 3—3 in FIG. 1.
Figure 4:
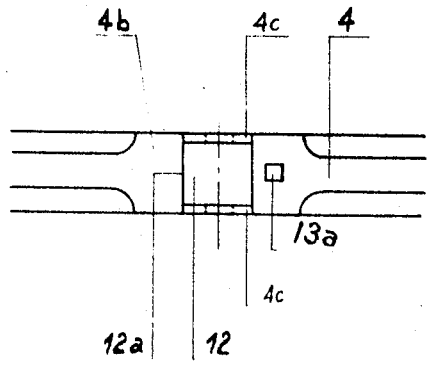
FIG. 4 is a plan view of a portion of the intermediate stirrup.
Figure 5:
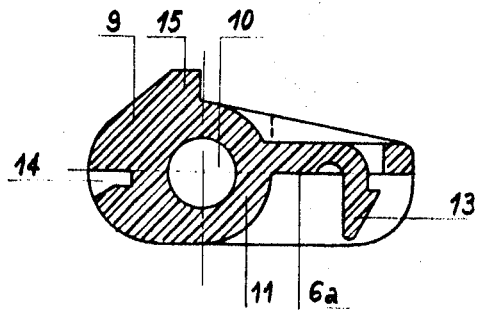
FIG. 5 is an enlarged longitudinal section taken centrally through the resilient bushing.
Figure 6:
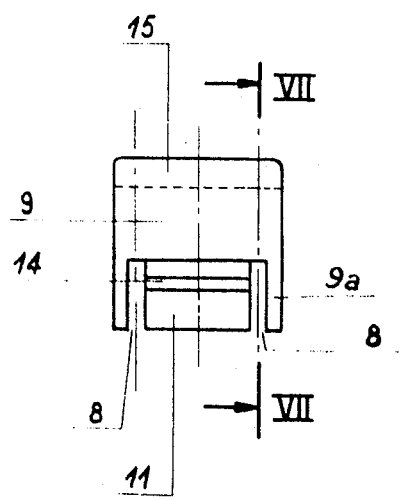
FIG. 6 is an end view of the bushing.
Figure 7:
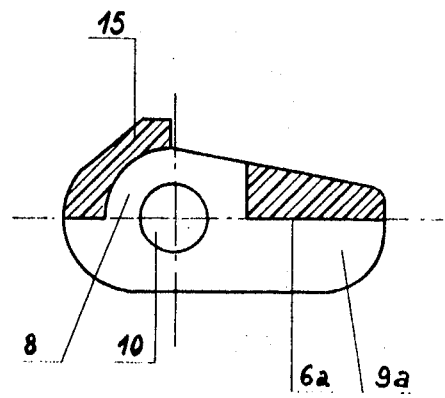
FIG. 7 is a section taken substantially along the plane of section line 7—7 in FIG. 6.

As may be seen in FIGS. 2–4, the intermediate stirrup 4 is of U-shaped cross section and includes the central bight portion or web 4b and the depending legs 4a, the web 4b being provided with an enlarged opening 12, extending between the opposite legs 4a and in the formation of the opening 12, upstanding flanges 4c may be struck outwardly therefrom in upstanding relation to the web 4b and which are in coplanar relationship with the side walls or legs 4a. The openings in the opposite sides of the intermediate stirrup 4 which receive the pin 7 extend partially into the flanges 4c as may be seen in FIG. 3.

The ends of the main stirrup 3 straddle the intermediate stirrups 4 with the depending ears 3b of the main stirrup lying in outwardly spaced parallel relationship to the opposite sides of the intermediate stirrup and with the top wall 3a spaced appreciably above the web 4b of the intermediate stirrup.

The resilient bushing 6 is snap-fitted into the openings 12 and 13a of the intermediate stirrup with the main body portion 11 of the bushing fitted within the opening 12 and extending above and below the web 4b therewithin. The bushing includes a nose portion 9 provided with a transverse slot 14 which receives the edge 12a of the web 4b at one end of the opening 12 and the bushing also includes a tail portion having a depending knob 13 which is snap-fitted into the opening 13a. The flat intermediate undersurface 6a of the bushing rests upon the upper surface of the web 4b and the interengagement between the bushing and the web as effected by the slot 14 and the member 13 positions the transverse opening 10 through the bushing in substantial alignment with the openings in the intermediate stirrup 4 for receiving the pin 7. Thus, once the bushing is snapped into place, no further manipulation or alignment thereof is necessary.

The opposite sides of the bushing 6 are provided with partially free side cheek pieces or flaps 9a which, in the region 8 receive the flanges 4c and present slots accommodating for the thicknesses of the legs 4a and the thicknesses of these flaps, as will be seen in FIG. 3, is sufficient to fill the spaces between the ears 3b of the main stirrup 3 and the legs 4a of the intermediate stirrup. Thus, lost motion or play allowing relative movement between the main and the intermediate stirrups is prevented by the bushing assembly and the main and intermediate stirrups remain aligned allowing the wiper blade to remain in a plane generally perpendicular to the windshield.

The bushing further includes a transverse ridge piece 15 which is adapted to engage the end edge of the top wall 3a of the main stirrup 3 and thereby resist rotation of the intermediate stirrup 4 with respect to the main stirrup 3 and the disposition of the ridge 15 is such as to cause the wiper blade more efficiently to engage the windshield.

What is claimed is:

1. In a windshield wiper blade assembly of the type having an elongate, resilient wiper blade provided with a flexible backing member, an intermediate stirrup having opposite end portions engaging said backing member, and a main stirrup having an end portion pivotally connected to an intermediate portion of said intermediate stirrup, the improvement wherein:

the intermediate portion of said intermediate stirrup is of U-shaped configuration in cross section providing a web and parallel legs, said web having an opening therein extending between said legs, a resilient member having a main body portion frictionally held in said opening and extending below and above said web, said resilient member having depending opposite side cheek pieces extending downwardly along the outer sides of said legs, the corresponding end of said main stirrup having depending ears extending along said cheek pieces, and said ears, said legs, said main body portion and said cheek pieces having aligned openings therethrough, and a pivot pin extending through said aligned openings to connect said main and intermediate stirrups.

2. In the windshield wiper blade assembly as defined in claim 1 wherein said main body portion includes a nose portion having a slot receiving an edge of said web bounding the opening therein.

3. In the windshield wiper assembly as defined in claim 2 wherein said web is provided with a second opening, said main body portion being provided with a tail portion extending therefrom oppositely of said nose portion in overlying relation to said web, and including a depending projection received in said second opening.

4. In a windshield wiper assembly as defined in claim 2 wherein said corresponding end of the main stirrup includes a top wall extending between said ears, said top wall engaging said main body portion and said main body portion including a transverse ridge engaging the end edge of said top wall to limit pivotal motion between said main and intermediate stirrups.

5. In a windshield wiper assembly as defined in claim 1 wherein said corresponding end of the main stirrup includes a top wall extending between said ears, said top wall engaging said main body portion and said main body portion including a transverse ridge engaging the end edge of said top wall to limit pivotal motion between said main and intermediate stirrups.

6. In a windshield wiper blade assembly as defined in claim 1 wherein said intermediate portion of said intermediate stirrup is provided with upstanding flanges along the opposite sides of said opening of the web coplanar with said legs, said cheek pieces also overlying said flanges and said openings in said legs for receiving said pin extending into said flanges.

References Cited

UNITED STATES PATENTS

| | | | |
|---|---|---|---|
| 2,798,244 | 7/1957 | Nesson | 15—250.32 |
| 2,801,436 | 8/1957 | Scinta | 15—250.32 |
| 3,023,446 | 3/1962 | Prohaska | 15—250.32 |
| 3,179,969 | 4/1965 | Glynn | 15—250.32 |
| 3,408,679 | 11/1968 | Deutscher et al. | 15—250.32 |
| 3,416,180 | 12/1968 | Deutscher et al. | 15—250.32 |

FOREIGN PATENTS

| | | | |
|---|---|---|---|
| 615,364 | 1/1948 | Great Britain | 15—250.32 |

JAMES KEE CHI, Primary Examiner